United States Patent [19]

Simon

[11] 4,204,027
[45] May 20, 1980

[54] PHOTOCHROMIC SHEET GLASS PROCESS

[75] Inventor: Raphael A. Simon, Avondale Estates, Ga.

[73] Assignee: Corning Glass Works, Corning, N.Y.

[21] Appl. No.: 27,498

[22] Filed: Apr. 5, 1979

[51] Int. Cl.² .................. B32B 33/00; B32B 17/06; C03B 17/00; C03B 5/26
[52] U.S. Cl. ........................... 428/428; 65/90; 65/121; 65/DIG. 2; 428/913
[58] Field of Search ............... 65/90, DIG. 2, 121; 428/428, 913

[56] References Cited

U.S. PATENT DOCUMENTS

| | | | |
|---|---|---|---|
| 1,734,964 | 11/1929 | Danner | 65/121 |
| 2,992,517 | 7/1961 | Hicks, Jr. | 65/DIG. 7 |
| 3,197,296 | 7/1965 | Eppler et al. | 65/DIG. 2 |
| 3,208,860 | 9/1965 | Armistead et al. | 65/DIG. 2 |
| 3,218,143 | 11/1965 | De Lajarte | 65/90 |
| 3,338,696 | 8/1967 | Dockerty | 65/121 |
| 3,519,411 | 7/1970 | Cortright et al. | 65/90 |
| 3,582,306 | 6/1971 | Giffen | 65/121 |
| 3,673,049 | 6/1972 | Giffen et al. | 65/121 |
| 3,737,294 | 6/1973 | Dumbaugh, Jr. et al. | 65/121 |
| 3,791,806 | 2/1974 | Koizumi et al. | 65/121 |
| 4,009,318 | 2/1977 | Elmer et al. | 428/428 |
| 4,018,965 | 4/1977 | Kerko et al. | 65/DIG. 2 |
| 4,088,470 | 5/1978 | Bourg et al. | 65/DIG. 2 |
| 4,130,680 | 12/1978 | Ference et al. | 428/913 |

*Primary Examiner*—William J. Van Balen
*Attorney, Agent, or Firm*—John P. DeLuca; Burton R. Turner

[57] ABSTRACT

A relatively thin layer of molten photochromic glass is formed on the surface of a relatively thick molten core glass of greater viscosity than that of the photochromic glass as such core glass is drawn into sheet form. The core glass is selected for its viscosity-temperature characteristics such that the core glass will support the photochromic surface glass during the temperature cycle required for developing the photochromic properties of such surface glass.

9 Claims, 2 Drawing Figures

PHOTOCHROMIC SHEET GLASS PROCESS

BACKGROUND OF THE INVENTION

The invention relates to the art of forming articles from molten glass, and more particularly to the formation of articles from sensitized photochromic glass.

When forming articles from phototropic or photochromic sheet glass such as sunglass lenses or windows for trains, busses, automobiles and the like, the temperature cycle which is required to sensitize the reversible darkening and fading properties of photochromic glass compositions subjects the glass to times and temperatures, and of course viscosities, other than those that are required to sag the sheet glass into such lenses or windows. Thus, during normal sensitizing cycles, the photochromic sheet glass had a tendency to severely distort or deform which rendered it useless for its intended purpose. Although it would be possible to hold sheets of flat photochromic glass in a verticle or upright position while they pass through the high temperature, low viscosity region required to develop the reversible photochromic properties, and then tilt them to a sagging position during the ensuing cooling cycle to bring the object down to room temperature, such a procedure would not only require extremely fine control of the temperature cycle but also the use of complex mechanisms made from special materials with high temperature capabilities, as the sheet would have a tendency to elongate and to wrinkle at its supporting points. As an alternative solution, a former with the desired final shape of the article could be used to allow the sheet of photochromic material to sag over the former during the sensitizing temperature cycle, however such a procedure has a disadvantage of impressing marks from the surface of the former on the pristine, fire-polished drawn sheet glass, thus destroying the optical quality which is of paramount importance in the use for which the lenses or windows are intended. Finally, a third method would be to sag and sensitize the articles during the same temperature cycle without deleteriously contacting anything, as suggested in U.S. Pat. No. 4,088,470, however most known photochromic glass compositions will not function in this manner for producing many products.

The present invention, however, teaches a way of obtaining a preferred method of sagging and sensitizing the photochromic glass during the same temperature cycle by laminating a molten photosensitive skin glass onto a molten higher viscosity core glass.

It thus has been an object of the present invention to improve upon the known technology of forming and sensitizing photochromic glass articles by initially laminating a skin of photosensitive glass onto a core glass of higher viscosity during the forming of such glasses into sheet, and utilizing such core glass to support the photochromic skin glass during the sensitizing cycle.

SUMMARY OF THE INVENTION

In its very simplest form, the present invention relates to the formation of articles from photochromic sheet glass. A skin of photochromic glass is formed on a core of more viscous glass while such glasses are in a molten state and as they are drawn into a laminated sheet glass. The core glass provides a support for the photochromic skin glass when such photochromic glass is subjected to the required temperature cycle for developing its photochromic properties, whether on the draw immediately after forming or subsequently after cooling, and thus prevents deleterious deformation of such glass during the necessary temperature cycle. Preferably, the core glass is selected for its viscosity-temperature characteristics such that it will simultaneously sag to the curvature of the desired product when the photochromic surface glass is subjected to the temperature cycle of its required sensitizing process.

DESCRIPTION OF THE PREFERRED EMBODIMENTS

Figure 1:
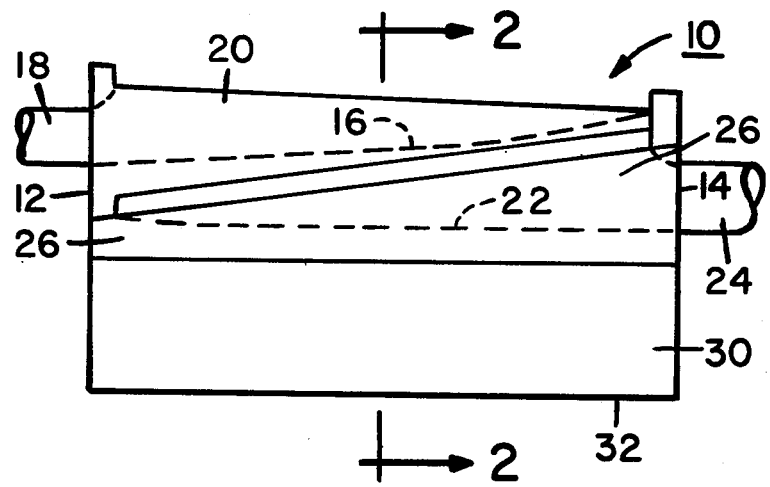
FIG. 1 is a somewhat schematic side elevational view of one form of apparatus for forming the laminated photochromic sheet of the present invention.

A preferred method of forming the laminated photochromic glass of the present invention is shown in the accompanying drawings wherein sheet forming apparatus 10 includes an upper overflow trough 12 and a lower overflow forming wedge member 14. The upper overflow trough 12 has a channel 16 fed by inlet pipe 18 and bounded by sidewalls 20, whereas lower overflow forming member 14 also has an upwardly open channel 22 fed by inlet pipe 24 and bounded by sidewalls 26. The lower portion 28 of forming member 14 is wedge shaped and has a pair of downwardly converging forming surfaces 30 which communicate at their upper ends with the outer surfaces of sidewalls 26 and converge at their lower end into a glass draw line 32.

Figure 2:
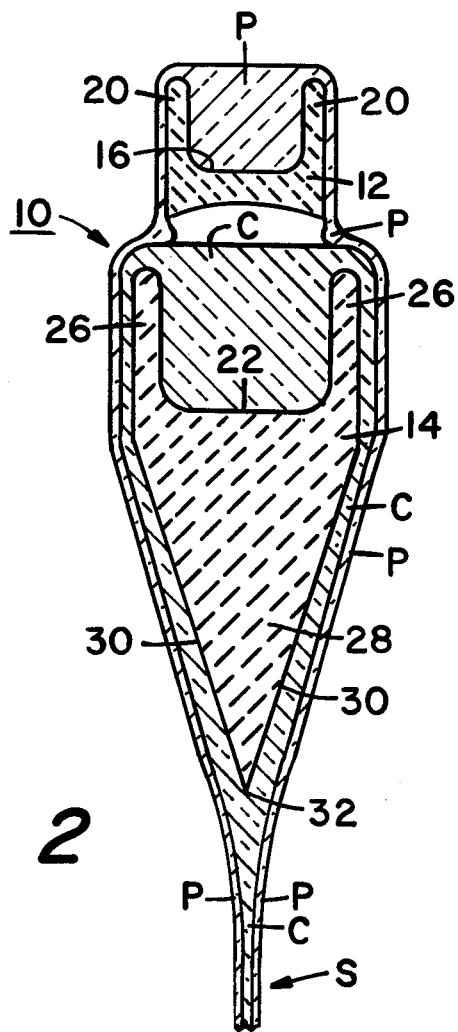
FIG. 2 is an elevational view in section taken along line 2—2 of FIG. 1, showing the glass flows forming the laminated sheet.

As shown particularly in FIG. 2, the upper overflow trough 12 is centered over the lower overflow forming wedge member 14 such that the axial center line of upper channel 16 lies in a vertical plane extending through the axial center line of lower channel 22. In order for the overflow from upper channel 16 to flow upon the overflow from lower channel 22, the upper channel 16 as defined by sidewalls 20 has an equal or smaller width than the lower channel 22 as defined by sidewalls 26 with its layer of flowing glass C.

Molten photochromic skin glass P, which is supplied to the upper channel 16 by inlet pipe 18, overflows the upper weir surfaces of sidewalls 22 along the length of such sidewalls and flows downwardly along the outer surface thereof. Simultaneously, molten core glass C, supplied to lower channel 22 by inlet pipe 24, wells upwardly over the upper weir surfaces of sidewalls 26 and flows downwardly along the outer surface thereof. The photochromic skin glass P flows off of the lower extent of sidewalls 20 and onto the upper surface of the core glass C from whence it flows downwardly along the outer surface of the core glass. Both glasses flow downwardly along the converging surfaces 30 of the wedge portion 28 to draw line 32 where the laminate layers from the two sides of the wedge portion unite and become a single photochromic laminated sheet S comprising a core C and two outer surface or skin layers of photochromic glass P. The core glass, being more viscous at forming temperatures than that of the photochromic skin glass, provides a support for the photochromic skin glass during the formation of the laminated sheet, and accordingly the photochromic glass P may be sensitized on the draw immediately after the supporting laminated sheet S is formed by subjecting the same to sensitizing temperatures.

As previously mentioned, the purpose of laminating the photochromic glass onto the core glass is to provide a support for the photochromic glass as it undergoes its sensitizing treatment wherein the photochromic glass is subjected to a thermal cycle necessary to develop the photochromic properties. Although the required thermal cycle is time and temperature dependent, in order to obtain economic feasibility by limiting the time constraints, it is necessary to utilize sensitizing temperatures which are above the softening point temperature of the photochromic glass, which inherently had the tendency to materially deform and distort the glass being treated. Therefore, a core glass is selected having a softening point substantially equal to or greater than the required sensitizing temperatures for the photochromic glass so as to support the photochromic glass during the required temperature cycle for producing the photochromic properties. However, when a core glass is selected having a viscosity curve such that its softening point is substantially equal to the temperatures utilized in sensitizing the photochromic glass, a simultaneous sagging to the curvature of the required product and sensitizing of the photochromic glass can be obtained.

The invention is applicable to virtually all photochromic or phototropic compositions as they are interchangably known, such as set forth in U.S. Pat. Nos. 3,197,296 and 3,208,860. As noted particularly in the former patent, the softening point of such glasses is in the range of about 640°-670° C., whereas an economical short time period sensitizing temperature range is about 720°-750° C., which is substantially higher than the softening point of such glasses. Accordingly, a core glass having a softening point approximately equal to or higher than the highest portion of such sensitizing range should be used to support the photochromic glass skin during the sensitizing cycle. Typical commercial soda lime glasses such as used in window sheet, plate glass and containers has a softening point about 730°-735° C., and accordingly not only provides an adequate support for the photochromic skin glass as it is being sensitized, but also will simultaneously sag into the desired configuration of the article to be produced with the sensitizing cycle.

After the laminated photochromic sheet is formed, and assuming it has not been sensitized on the draw, it is cut into desired sizes and shapes by known glass cutting techniques and then subjected to conventional sagging operations wherein the sheet is sagged on known sagging molds for frames into a desired contour. However, according to this invention, the sagging cycle utilized is in fact the necessary sensitizing temperature cycle required to develop the photochromic properties and color in the photochromic skin glass, so that simultaneous sensitizing and sagging is accomplished. In view of the time and temperature relationship which is inherent in any sagging operation, it is possible to utilize a core glass having a softening point which is slightly less than the uppermost temperature of the sensitizing cycle by about 10° or 20° C., in view of the inherent viscosity time lag which would still provide adequate support for the skin glass. Further, should a core glass having a softening point higher than the sensitizing temperature range utilized, a two-step operation could be utilized wherein the core glass maintains the sheet form during sensitizing and then is subsequently sagged at a higher temperature into the desired configuration. Preferably, in all instances, the sagging is accomplished without the optical area contacting any surfaces which would detrimentally affect the optical qualities of the photochromic glass, such as shown in U.S. Pat. No. 4,088,470.

By no means limiting in nature, but purely as one specific example of the invention, apparatus such as shown in the drawings was utilized and a soda lime core glass having a softening point of about 700° C. was fed to the lower channel at a rate of about 140 pounds per hour forming a core of about 0.1", whereas a photochromic glass having a softening point of about 650° C. was supplied to the upper channel at a rate of about 12 pounds per hour forming a skin of about 0.02" on each side of the core glass. The thus formed sheet, after cooling, may then be cut into desired sections for sagging into any desired shape such as an automotive sun roof. A sensitizing cycle such as set forth under designation Q, R or S of Table II of U.S. Pat. No. 3,197,296 could be utilized to simultaneously strike in the sensitizing properties of the photochromic skin glass while simultaneously sagging the sheet to the desired configuration.

Although the preferred method for forming the laminated photochromic sheet glass of the present invention has been set forth, other methods of forming the sheet glass may be utilized such as those shown in U.S. Pat. Nos. 1,734,964, 3,218,143 and 3,582,306, however it is felt that fewer problems relative to thickness control and surface quality are encountered with the preferred method. Further, if desired, the photochromic sheet glass may be laminated to only one surface of the core glass instead of both surfaces, by merely applying only one flow.

Although I have disclosed a now preferred embodiment of the invention, various changes and modifications may be made thereto without departing from the spirit and scope thereof as defined in the appended claims.

I claim:

1. A method of forming photochromic glass articles comprising, drawing a sheet of core glass, forming a skin of photochromic glass on a surface of said core glass to form a sheet of laminated photochromic glass, and subjecting said laminated photochromic sheet glass to a sensitizing temperature cycle having an upper range above the softening point temperature of said photochromic glass to develop the photochromic properties of such glass while supporting said photochromic glass against deleterious deformation by said core glass.

2. A method of forming photochromic glass articles as defined in claim 1 including the steps of forming said skin of photochromic glass on outside surfaces of said core glass, and applying such photochromic glass in a molten condition simultaneously with the drawing of said core glass.

3. A method of forming photochromic glass articles as defined in claims 1 or 2 wherein a core glass is supplied having a softening point temperature which is higher than about 20° C. below the upper range of the sensitizing cycle utilized to develop the photochromic properties of said photochromic skin glass.

4. A method of forming photochromic glass articles as defined in claim 1 including the step of sensitizing said skin of photochromic glass while simultaneously sagging said laminated glass sheet into a desired article.

5. A method of forming photochromic glass articles as defined in claims 1 or 4 comprising the steps of sagging the laminated photochromic sheet glass into an article of desired configuration, and supplying a core glass having a viscosity temperature characteristic selected such that the core glass will sag into the form of a desired article while the photochromic skin glass is subjected to said sensitizing temperature cycle and to thereby simultaneously sensitize said photochromic skin glass and sag said laminated sheet glass into a desired article.

6. A method of forming photochromic glass articles as defined in claims 1 or 2 including the step of sensitizing said photochromic glass on the draw immediately after forming said laminated photochromic glass sheet.

7. A laminated photochromic glass article comprising a central core portion of a non-photochromic glass composition and a layer of photochromic glass formed integrally with outer surfaces of said core glass, said photochromic glass being sensitized and having a sensitizing temperature above its softening point temperature, and said core glass having a softening point temperature higher than the softening point temperature of said photochromic glass.

8. A laminated photochromic glass article as defined in claim 7 wherein said core glass has a softening point temperature which is not lower than about 20° C. below the sensitizing temperature of said photochromic glass.

9. A laminated photochromic glass article as defined in claim 7 wherein the core glass is selected to have a viscosity such that the laminated photochromic glass will sag to a desired configuration when subjected to said sensitizing temperature.

* * * * *